Jan. 16, 1951  J. B. SIMRELL  2,538,129
PORTABLE STEAMER FOR SHAPING MILLINERY
Filed July 12, 1948  3 Sheets-Sheet 1

INVENTOR.
John B. Simrell,
BY Victor J. Evans & Co.
ATTORNEYS

Jan. 16, 1951   J. B. SIMRELL   2,538,129
PORTABLE STEAMER FOR SHAPING MILLINERY
Filed July 12, 1948   3 Sheets-Sheet 2

INVENTOR.
John B. Simrell,
BY Victor J. Evans & Co.
ATTORNEYS

Jan. 16, 1951   J. B. SIMRELL   2,538,129
PORTABLE STEAMER FOR SHAPING MILLINERY
Filed July 12, 1948   3 Sheets-Sheet 3
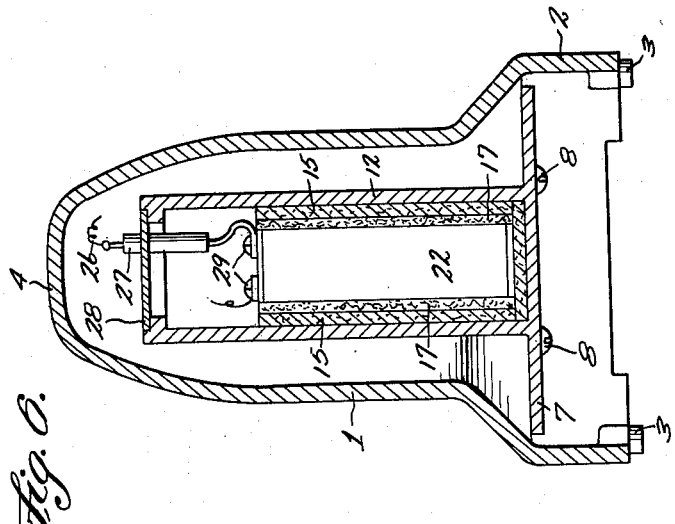
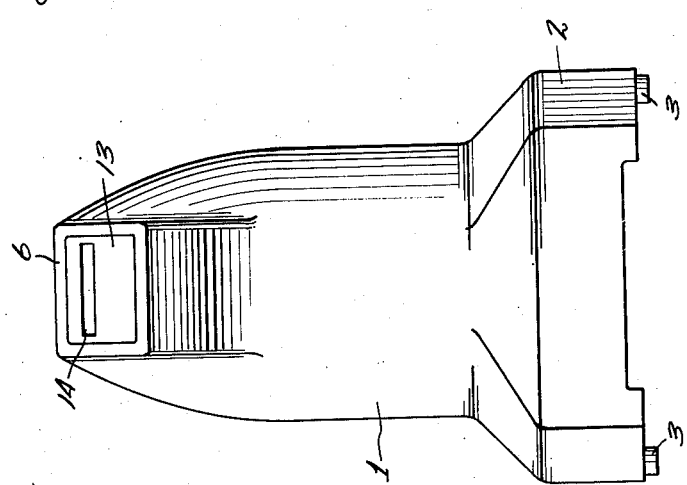
INVENTOR.
John B. Simrell,
BY Victor J. Evans & Co.
ATTORNEYS Patented Jan. 16, 1951

2,538,129

UNITED STATES PATENT OFFICE 2,538,129

PORTABLE STEAMER FOR SHAPING MILLINERY

John B. Simrell, Chicago, Ill.

Application July 12, 1948, Serial No. 38,330

1 Claim. (Cl. 219—40)

My present invention relates generally to electrical heaters of the immersion type, and more specifically to a portable steamer for shaping millinery and other similar articles, by means of which water is atomized and vaporized and the steam discharged from the appliance and employed in steaming or shaping hats and other articles of millinery. The primary object of the invention is the provision of a device or electrical appliance by means of which a comparatively small volume of steam may quickly be generated and discharged into or around the hat that is being manipulated and shaped, and for this purpose the invention includes a minimum number of parts that may with facility be manufactured with low cost of production, and the parts may be assembled with convenience, to insure a quick-acting steamer of simple construction and operation.

The invention consists in certain novel features of construction and combinations and arrangements of parts as will hereinafter be described and more particularly set forth in the appended claims. In the accompanying drawings I have illustrated a complete example of a physical embodiment of my invention, in which the parts are combined and arranged in accord with one mode I have devised for the practical application of the principles of the invention. It will, however, be understood that changes and alterations are contemplated and may be made in these exemplifying drawings and mechanical and electrical structures, within the scope of my claim without departing from the principles of the invention.

Figure 5 is a front end elevation; and Figure 6 is a vertical transverse sectional view at line 6—6 of Fig. 1.

Figure 1:
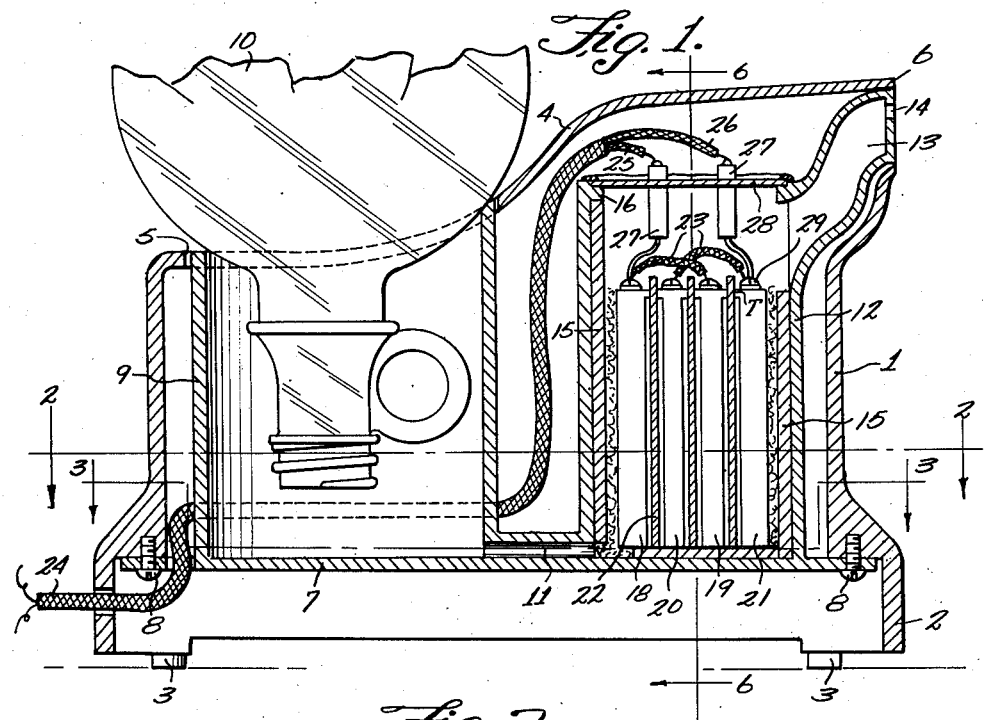
Figure 1 is a longitudinal vertical sectional view of an appliance in which my invention is embodied.
Figure 2:
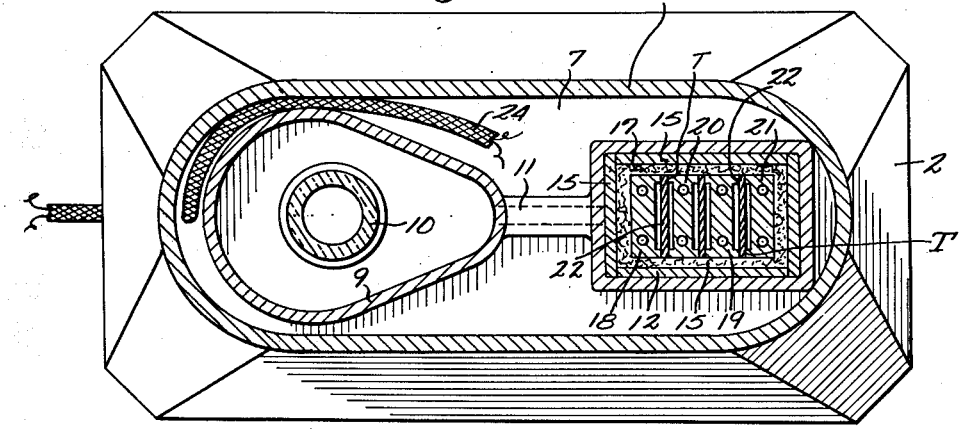
Figure 2 is a horizontal sectional view at line 2—2 of Fig. 1.
Figure 3:
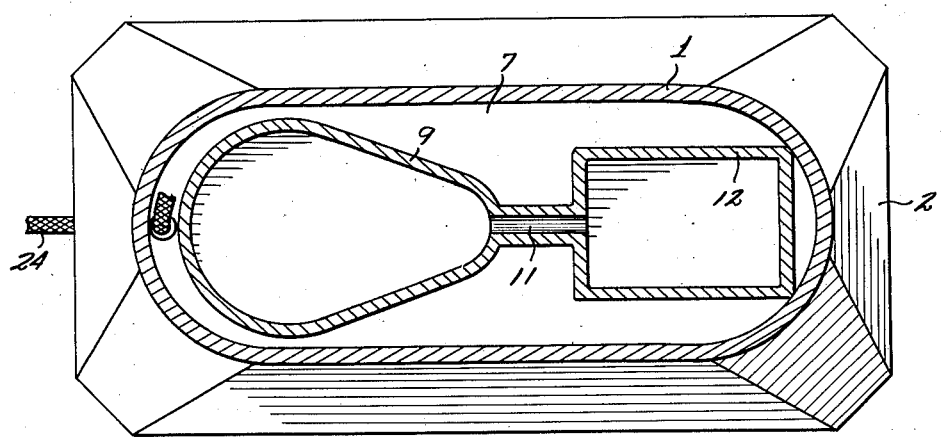
Figure 3 is a horizontal sectional view at line 3—3 of Figure 1.
Figure 4:
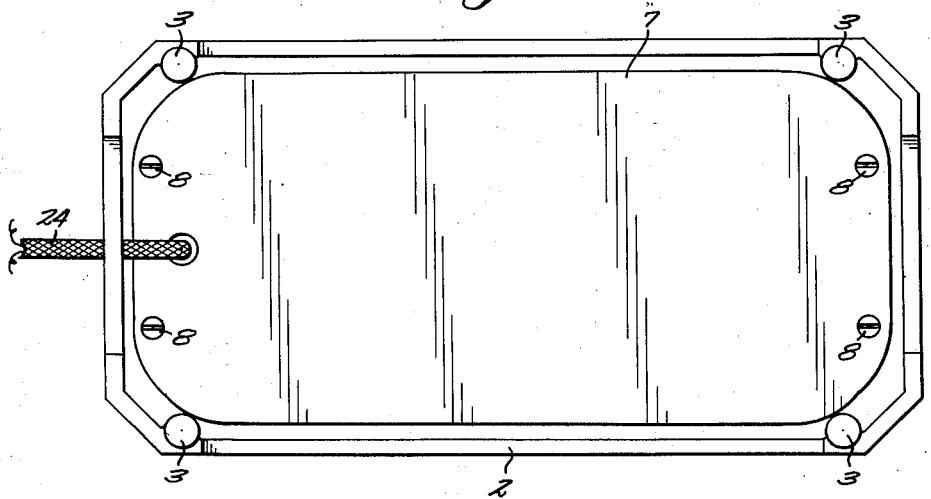
Figure 4 is a bottom plan view of the appliance.

In this preferred form of the invention an open bottom housing 1 of suitable cast material and substantially oblong shape with rounded ends, is fashioned with a bottom flange 2 and supporting pads or feet 3, so that the appliance may stand upon a work table or bench, or other suitable support.

The open-bottom housing is provided with a top wall 4 that is fashioned near one end with a cylindrical opening 5, and the front end of the housing terminates in an upper rectangular spout 6.

The open-bottom housing of insulating material forms a receptacle for a removable, interior integral enclosure or casing, also of insulating material, which includes a flat bottom plate 7 that is secured by screws 8 within the flanged bottom of the housing, and the plate is fashioned with a cylindrical wall 9 that forms a water well or reservoir with its upper edge fitted in the opening 5 of the housing.

The upper edge of the well or reservoir forms a seat for an inverted water bottle 10 that provides a gravity feed of water to the interior of the reservoir, and by means of a bottom duct, or tubular neck 11 the reservoir communicates with the bottom portion of a holder 12 that is equipped with a nozzle 13 that is slotted at 14 to form a discharge port for steam. The rectangular holder forms in its upper end a steam chamber from which steam flows through the nozzle 13 and port 14, and the holder encloses a cell or sleeve 15 containing the electrical heating unit that generates steam for the steam chamber of the holder, which latter, preferably, is provided with a porcelain coating to insulate it from the housing.

The heating unit, enclosed in the cell 15 slides upwardly into the holder 12 against an interior flange 16 of the open-top holder, and the cell 15 that is open to the water supply duct 11 is provided with an open-work or reticulated inner lining 17 of suitable material, as fiber glass or spun glass that is formed with multiple interstices, and this lining is instrumental in breaking up the gravity fed water into small quantities and at the same time impede the flow of the water supply in order that the water may be separated into globules or droplets before it is vaporized. Thus the gravity fed water in small volume from the tubular neck surrounds the heating unit, and the electrical heating unit vaporizes the globules or droplets of water to provide steam in the steam chamber, when the heating current or circuit is closed.

As here shown the heating unit includes two pairs of electrodes 18 and 19, and 20 and 21, each of which electrodes is provided with lateral tongues or ribs T on adjoining faces of the electrodes and the electrodes are spaced apart by insulating spacer blades 22 in contact with the tongues T, thus providing surfaces of wide area for the electrodes of the unit and thereby enhancing the generation of steam from the globules or droplets of water. The blades 22 are preferably made from a suitable type of asbestos millboard or they can be made from any material that will absorb water.

The electrical heating plates are coupled in pairs by conductor wires 23, and a cord or cable 24, that may readily be plugged in or connected to an outlet box, provides the conductors 25 and 26, which are supported in terminal guards 27 mounted in the removable top or covers 28 of the cell that rests on the flange 16. As shown in Fig. 1 the conductor wires 25 and 26, after passing through the guards, are fastened to the terminals 29 of the heating unit.

Having thus fully described my invention, what I claim as new and desire to secure by Letters Patent is:

In an electrically heated steamer for millinery and similar articles, the combination with an open bottom housing having a top wall provided with an opening for an inverted water-bottle and a spaced end spout, of a removable bottom plate having a wall forming a reservoir beneath the bottle, said wall extending into said opening and forming a seat for said bottle, a spaced open-top holder having a steam outlet nozzle located in the spout, a bottom water-duct connecting the reservoir and the holder, an electrical heating unit mounted within the holder, and a heating circuit for the unit.

JOHN B. SIMRELL.

REFERENCES CITED

The following references are of record in the file of this patent:

UNITED STATES PATENTS

| Number | Name | Date |
|---|---|---|
| 1,532,199 | Otto | Apr. 7, 1925 |
| 1,756,053 | Colton | Apr. 29, 1930 |
| 1,827,639 | Boschetti | Oct. 13, 1931 |
| 1,974,500 | Martin | Sept. 25, 1934 |
| 1,988,790 | Gross | Jan. 22, 1935 |
| 2,024,467 | Mason | Dec. 17, 1935 |
| 2,062,613 | Schleimer | Dec. 1, 1936 |
| 2,230,245 | Hettinger | Feb. 4, 1941 |
| 2,369,623 | Utley et al. | Feb. 13, 1945 |
| 2,371,475 | Shelby et al. | Mar. 13, 1945 |